United States Patent [19]
Khinkis et al.

[11] Patent Number: 5,203,859
[45] Date of Patent: Apr. 20, 1993

[54] OXYGEN-ENRICHED COMBUSTION METHOD

[75] Inventors: Mark J. Khinkis, Morton Grove; Hamid A. Abbasi, Darien, both of Ill.

[73] Assignee: Institute of Gas Technology, Chicago, Ill.

[21] Appl. No.: 872,288

[22] Filed: Apr. 22, 1992

[51] Int. Cl.$^5$ .............................................. F24H 7/00
[52] U.S. Cl. .................................... 432/30; 432/180; 432/111; 432/54
[58] Field of Search ................. 432/30, 180, 181, 54, 432/209, 210, 161

[56] References Cited

U.S. PATENT DOCUMENTS

| | | | |
|---|---|---|---|
| 3,051,462 | 8/1962 | Fennell | 432/180 |
| 3,207,493 | 9/1965 | Swain | |
| 4,358,268 | 11/1982 | Neville | |
| 4,496,315 | 1/1985 | Savolskis | 432/180 |
| 4,496,316 | 1/1985 | Tsai | 432/180 |
| 4,540,361 | 9/1985 | Gagne | 432/181 |
| 4,666,403 | 5/1987 | Smith | |
| 4,761,132 | 8/1988 | Khinkis | |
| 4,874,311 | 10/1989 | Gitman | |
| 4,909,727 | 3/1990 | Khinkis | |
| 5,102,330 | 4/1992 | Ho | 432/111 |

FOREIGN PATENT DOCUMENTS 0306657  6/1990  European Pat. Off.

OTHER PUBLICATIONS

Abbasi, H. A. et al., *Development of NOx Control Methods for Glass Melting Furnaces*, Report for Gas Research Institute, Chicago, Illinois, Sep. 1983.

Barklage-Hilgefort, H., *Reduction of the NOx-Emission of Glass Melting Furnaces by Primary Measures*, Huttentechnische Vereinigung der Deutschen Glasindustrie (HVG), Frankfurt/Main, Germany.

*Primary Examiner*—Henry C. Yuen
*Attorney, Agent, or Firm*—Speckman & Pauley

[57] ABSTRACT

A process and apparatus for oxygen-enriched combustion of a fuel in an industrial furnace in which a preheated primary oxidant from a heat exchanger and a fuel to be combusted are introduced into a combustion chamber and ignited, a secondary oxidant having an oxygen concentration in excess of the concentration of oxygen in air is introduced into the combustion chamber downstream of the flame, and the resulting combustion products are exhausted. In accordance with one embodiment, the secondary oxidant comprises preheated oxidant aspirated from the heat exchanger using industrial-grade oxygen, resulting in an oxygen-enriched mixture being injected into the combustion chamber downstream of the flame. As a result, $NO_x$ emissions are reduced without adverse effects on the overall furnace operation.

8 Claims, 1 Drawing Sheet

OXYGEN-ENRICHED COMBUSTION METHOD

BACKGROUND OF THE INVENTION

1. Field of the Invention

This invention relates to a process and apparatus for oxygen-enriched combustion of a fuel in an industrial furnace, in particular, a natural gas fired, regenerative glass furnace, which significantly reduces $NO_x$ emissions while improving production rate, glass quality, and furnace thermal efficiency, with no adverse effect on other air pollutant emission levels.

2. Description of the Prior Art

It is generally known that oxygen-enriched combustion, usually implemented by increasing the oxygen concentration of the combustion air or by direct injection of oxygen into the flame, increases production rate as well as furnace thermal efficiency. However, to provide such increases in production rate and furnace thermal efficiency, oxygen-enriched combustion increases the peak flame temperature, a condition which directly conflicts with known methods for reducing the formation of $NO_x$. In addition, oxygen-enriched combustion is known to raise furnace refractory temperatures, particularly in the furnace zones where temperatures are already very high, thereby adversely affecting the service life of the furnace.

It is generally known that to control the amount of $NO_x$ emissions generated by a combustion process, it is necessary to reduce the amount of oxygen available for $NO_x$ formation. It is also generally known that peak flame temperatures in the combustion process must be maintained below the level required for substantial formation of $NO_x$. Many approaches to producing such conditions to reduce $NO_x$ emissions generated in combustion processes, including oxygen-enriched combustion and staged combustion, have been used, investigated, or proposed.

U.S. Pat. No. 4,761,132 and related U.S. Pat. No. 4,909,727 relate to a process and apparatus for oxygen-enriched combustion which provides increased heat transfer to the furnace load, enhanced furnace specific production rate, improved furnace thermal efficiency and reduced emissions of $NO_x$. The '132 patent teaches a process and apparatus for oxygen-rich combustion in which a first portion of fuel and an oxygen-rich gas are introduced into a cracking chamber and cracked to produce a cracked products mixture. The cracked products mixture, a second portion of fuel, and an oxidizer having sufficient oxygen for substantially completing combustion of the combustible portion of the cracked products mixture and the fresh fuel are subsequently introduced into a combustion chamber for completion of the combustion process. The '727 patent teaches a process for combustion as taught by the '132 patent where the process is carried out in a continuous regenerative furnace.

One approach to staged combustion involves air staging, a two stage combustion process, in which oxygen available for $NO_x$ formation is reduced by operating the initial stage of the combustion process at close-to-stoichiometric conditions, forming a close-to-stoichiometric primary combustion zone, removing heat from the primary combustion zone, and adding combustion air downstream of the primary combustion zone in the second stage of combustion to complete combustion. In addition to ensuring the absence of a sufficient amount of oxygen for high amounts of $NO_x$ formation, temperatures in the primary combustion zone are generally maintained below the level required for substantial $NO_x$ formation.

Reduction of $NO_x$ emissions in a regenerative glass melting furnace using air staging is taught by Abbasi, H. A. et al., *Development of $NO_x$ Control Methods for Glass Melting Furnaces*, Report for Gas Research Institute, Chicago, Ill., September 1983 in which preheated primary combustion air flow was reduced producing relatively fuel-rich combustion and ambient secondary combustion air was injected into the furnace proximate the furnace exit to burn out combustibles in the combustion products. Reduction of $NO_x$ emissions in a regenerative glass melting furnace using air staging is also taught by Barklage-Hilgefort, H., *Reduction of the $NO_x$ Emission of Glass Melting Furnaces by Primary Measures*, Huttentechnische Vereinigung der Deutschen Glasindustrie (HVG), Frankfurt/Main, Germany, where a portion of the combustion air required for complete combustion is removed from the top of a regenerator and introduced into the furnace downstream of the flame. See also European Patent 0 306 657.

Staged combustion using air staging is also taught by U.S. Pat. No. 4,358,268 in which a preheated fuel-rich combustion mixture is fed into an industrial furnace system having a heating chamber, the mixture having been preheated in a first regenerator. Flue gases from the heating chamber are exhausted through a second regenerator into which is fed secondary combustion air to more completely oxidize the flue gases. A portion of the hot flue gases leaving the second regenerator is recirculated to the heating chamber and the remaining flue gases, having been fully oxidized, are vented to the atmosphere. The flow of flue gases within the heating chamber is periodically reversed such that the fuel-rich combustion mixture is heated in the second regenerator and the flue gases from the heating chamber are exhausted through the first regenerator to which secondary combustion air is added. Such reversal of flows is typical of the operation of regenerative-type industrial furnaces, including regenerative glass-melting furnaces. As taught by this patent, secondary combustion air is preheated in the regenerator through which the combustion products are exhausted and then reintroduced into the bottom of the regenerator to mix with the exhausting flue gases and complete combustion therein. One disadvantage of this approach is the significant amount of additional ducting and blowers required for implementation. A second disadvantage arises from the fact that combustion is occurring within the exhaust regenerator, which combustion can produce localized hot spots within the regenerators and lead to premature deterioration thereof.

U.S. Pat. No. 4,874,311 teaches a method and apparatus for staged combustion of a fuel in a regenerative furnace in which a first portion of fuel and an oxidizing gas are combusted in an auxiliary combustion chamber in the furnace to produce a luminous stream of hot, pyrolized combustion products which are directed to mix with hot combustion air from a regenerator to create a final flame in the furnace above the material to be heated or melted. A controlled amount of fuel is also directed through the combustion chamber where it mixes with the hot combustion products from the auxiliary combustion chamber and the hot combustion air to form the final flame pattern.

U.S. Pat. No. 4,496,316 teaches a method and apparatus for selectively controlling the combustion air flow in a furnace firing port of a furnace having a plurality of firing ports. To enhance the flow of combustion air within the furnace, a small quantity of pressurized gas, for example, air, is injected generally along the flow path of combustion air in the plenum of the firing port to induce additional flow into the port. Combustion air flow is decreased by injecting air countercurrent to the combustion air flow within the plenum to impede flow through the port into the combustion chamber.

U.S. Pat. No. 4,666,403 teaches a system for preheating combustion gas for a continuous fired furnace using high temperature waste gases exhausted from the furnace.

U.S. Pat. No. 3,207,493 teaches a regenerative furnace having two combustion air inlets and a separate outlet for combustion products, reversing valves for alternately connecting the cold ends of the regenerators with the cold air supply and the exhaust flue, and operative to connect the hot end of one regenerator alternately with the combustion air inlets and the hot end of the other regenerator with the combustion product outlet of the furnace chamber.

In air staging for regenerative glass melters, in particular, fuel is generally burned at the firing port(s) with a portion of hot combustion air, primary air, at fuel-rich conditions, and the remaining air, secondary air, is added so that it mixes with the fuel-rich flame after a substantial amount of heat has been removed. The fuel-rich combustion retards $NO_x$ formation due to both lower oxygen availability and lower flame temperatures. Also, because the secondary air mixes with the flame only after heat has been removed, the secondary peak flame temperatures are also lowered. However, splitting the combustion air in a regenerative glass tank as well as in other high-temperature furnaces is difficult because it requires major modifications, and can reduce furnace production rate, increase electricity consumption, and reduce furnace thermal efficiency In addition, proper mixing of the secondary air with the primary combustion gases requires higher secondary air pressures which are not desirable in a regenerative glass melter.

SUMMARY OF THE INVENTION

Accordingly, it is an object of this invention to provide a process and apparatus for oxygen-enriched combustion in a regenerative industrial furnace.

It is an object of this invention to provide a process and apparatus for oxygen-enriched combustion which reduces $NO_x$ emissions from regenerative industrial furnaces.

It is another object of this invention to provide a process and apparatus for oxygen-enriched combustion which reduces $NO_x$ emissions from regenerative industrial furnaces with no adverse effects on production rate, product quality, furnace thermal efficiency, and other air pollutant emission levels.

It is yet another object of this invention to provide a process and apparatus for oxygen-enriched combustion which reduces $NO_x$ emissions and provides improvements in product quality, production rate, furnace thermal efficiency, and other air pollutant emission levels.

It is yet another object of this invention to provide a process and apparatus for oxygen-enriched combustion which reduces $NO_x$ emissions from regenerative industrial furnaces and which can be applied to state-of-the-art, natural gas fired, high performance regenerative furnaces, in particular, glass melting furnaces.

It is yet another object of this invention to provide a process and apparatus for reducing $NO_x$ emissions from regenerative industrial furnaces which can be retrofit to existing regenerative industrial furnaces.

It is yet another object of this invention to provide a process and apparatus for combustion air staging using oxygen.

These and other objects are achieved in accordance with a process for oxygen-enriched combustion of a fuel in an industrial furnace in which an oxidant, preferably air, required for combustion of a fuel, preferably natural gas, is preheated in a heat exchanger. Preheated oxidant from the heat exchanger, primary oxidant, together with the fuel, is introduced into the industrial furnace, producing a fuel/oxidant mixture having a stoichiometric ratio of about 0.85 to about 1.15 and forming a primary combustion zone. That is, the amount of oxidant in the fuel/oxidant mixture is between about 0.85 and about 1.15 of the total amount of oxidant required for complete combustion of the fuel. The fuel/oxidant mixture is subsequently ignited to produce products of combustion containing combustibles in the primary combustion zone within the furnace. To maintain peak flame temperatures below the temperatures required for significant $NO_x$ formation in the primary combustion zone as well as in a secondary combustion zone disposed downstream of the primary combustion zone, heat is removed from the primary combustion zone primarily in the form of heat transfer to the load in the furnace. Additional oxidant, secondary oxidant, having an oxygen content greater than ambient air is introduced into the industrial furnace downstream of the flame resulting from ignition of the fuel/oxidant mixture, forming the secondary combustion zone and producing products of combustion in which the combustibles have been substantially completely oxidized. The products of combustion are then exhausted from the industrial furnace, preferably through a second heat exchanger.

In accordance with one embodiment of the process of this invention, the secondary oxidant is introduced proximate the exhaust of the industrial furnace to decrease secondary combustion zone temperatures and $NO_x$ formation.

In accordance with one embodiment of the process of this invention, the secondary oxidant is oxygen-enriched ambient air. In accordance with another embodiment of the process of this invention, the secondary oxidant is pure oxygen. In accordance with a particularly preferred embodiment of the process of this invention, the secondary oxidant is oxygen-enriched heated air.

In accordance with a particularly preferred embodiment of the process of this invention, a portion of preheated oxidant, preferably air, is withdrawn from the heat exchanger, mixed with oxygen to produce secondary oxidant in the form of oxygen-enriched preheated air and introduced into the industrial furnace downstream of the flame resulting from ignition of the fuel/oxidant mixture, forming a secondary combustion zone and producing products of combustion in which the combustibles have been substantially completely oxidized. The products of combustion are then exhausted from the industrial furnace, preferably through a second heat exchanger.

In accordance with one embodiment of the process of this invention, the preheated oxidant is withdrawn from the heat exchanger using industrial grade oxygen in an aspirator or ejector. In this manner, the combustion air is "oxygen-enriched" resulting in increased furnace-specific production rates. The use of oxygen-enriched secondary oxidant increases combustibles oxidation and secondary combustion zone temperatures, resulting in increased heat transfer to the load in the furnace. However, the increase is not enough to increase significantly the amount of $NO_x$ formed in the furnace.

The industrial furnace for oxygen-enriched combustion in accordance with a preferred embodiment of this invention comprises a combustion chamber having a primary combustion zone and a secondary combustion zone, said secondary combustion zone being disposed downstream of said primary combustion zone, means for preheating an oxidant in communication with the combustion chamber, means for introducing a fuel and at least a portion of the preheated oxidant into the primary combustion zone of the combustion chamber, means for withdrawing a portion of preheated oxidant from the means for preheating the oxidant, preferably using industrial grade oxygen, means for introducing the portion of preheated oxidant withdrawn from said means for preheating the oxidant into the secondary combustion zone of the combustion chamber, and means for exhausting the products of combustion from the combustion chamber. In a preferred embodiment of this invention, the means for exhausting the products of combustion from the combustion chamber comprise a heat exchanger for preheating said oxidant.

In accordance with another embodiment of this invention, means for withdrawing a portion of preheated oxidant from the means for preheating the oxidant are not required where the secondary oxidant is oxygen introduced directly into the secondary combustion zone within the combustion chamber.

In a preferred embodiment of this invention, the industrial furnace is a regenerative-type furnace in which the oxidant, preferably air, is preheated in a regenerator which is in communication with the combustion chamber. A line for transporting a portion of the preheated oxidant from the regenerator to the secondary combustion zone of the combustion chamber is in communication with the upper portion of the regenerator and the combustion chamber proximate a port for exhausting the products of combustion, that is, flue gases, from the combustion chamber. Disposed within the line is an aspirator or ejector connected to aspirate the portion of oxidant from the regenerator and direct the resulting mixture of oxidant and aspirating fluid, preferably, industrial grade oxygen into the combustion chamber.

BRIEF DESCRIPTION OF THE DRAWING

These and other features and aspects of this invention will be better understood from the figure taken in conjunction with the following detailed description, wherein.

DESCRIPTION OF PREFERRED EMBODIMENTS

Figure 1:
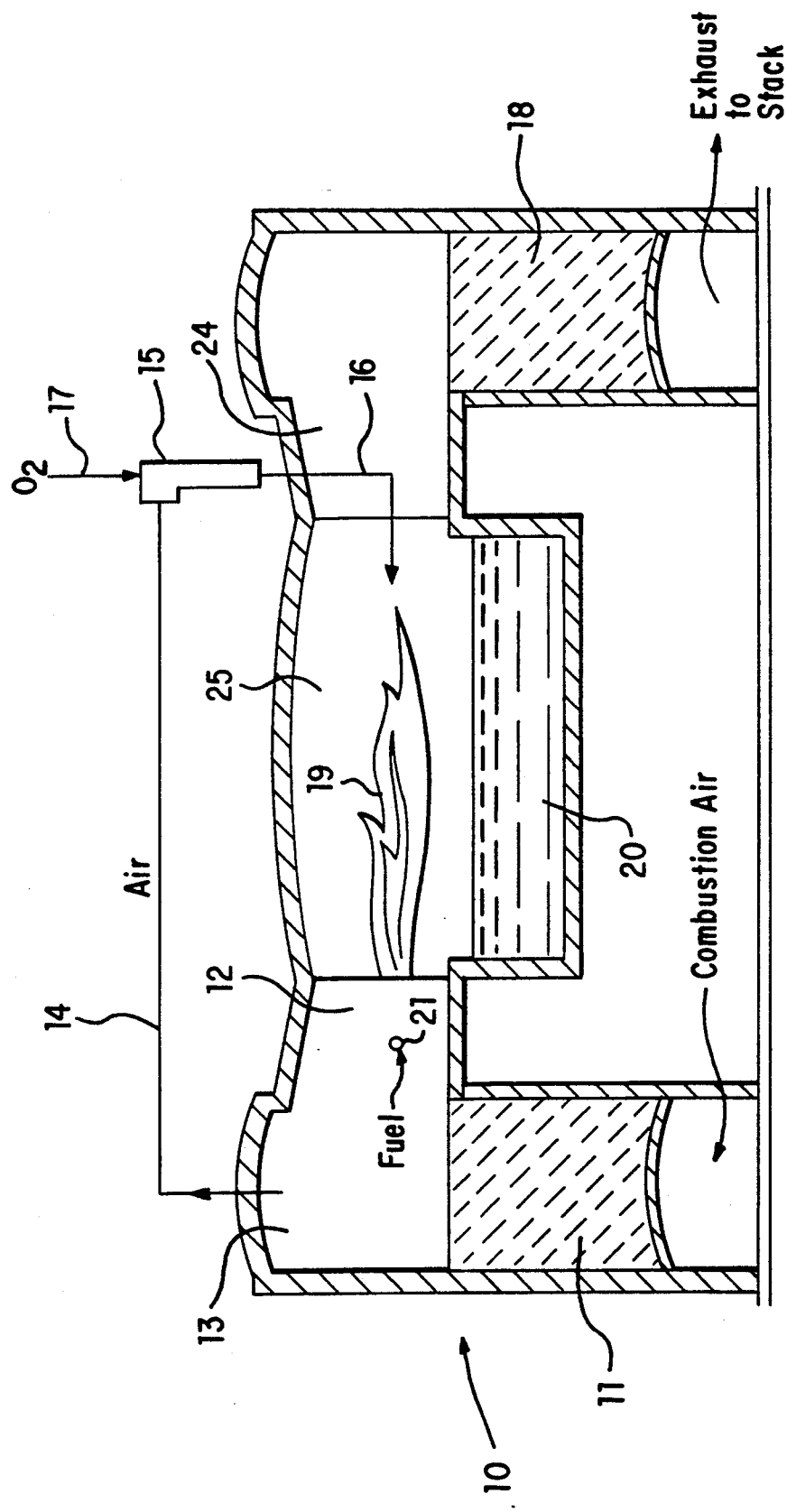
FIG. 1 is a vertical cross-sectional view of a regenerative sideport fired furnace incorporating features of this invention.

A typical regenerative furnace incorporating features of this invention is shown in FIG. 1. Regenerative furnace 10 comprises regenerators 11, 18, air ports 12, 24, burners 21 disposed in a sidewall of air ports 12, 24 for sideport firing, and combustion chamber 25 in which are disposed load 20, and flame 19 above load 20. It is apparent that regenerative furnaces can be fired with burners 21 positioned above air ports 12, 24, that is, overport firing, or with burners 21 positioned below air ports 12, 24, that is, underport firing. This invention is equally applicable to sideport, overport, and underport fired regenerative furnaces. It will also be apparent to those skilled in the art that this invention is also applicable to other types of industrial furnaces including recuperative furnaces and furnaces equipped with other types of combustion air and fuel ports.

In operation, oxidant, preferably in the form of combustion air, is introduced into the base of regenerator 11 in which the combustion air is preheated. It is apparent that other oxidants including oxygen-enriched combustion air may be used in the combustion process. From regenerator 11, combustion air flows through primary combustion air port 12 and into combustion chamber 25 where it mixes with fuel, preferably natural gas, from burner 21 to form flame 19. Heat, primarily in the form of radiation, is transmitted from flame 19 to load 20. It is apparent that the amount of material in load 20 which can be processed depends upon the amount of heat transferred from flame 19 to load 20. Thus, the more heat that is transferred from flame 19 to load 20, greater is the amount of material which can be processed. It is also apparent that load 20 is required for removal of heat from flame 19 to maintain peak flame temperatures generally below the temperature required for significant $NO_x$ formation. Combustion products generated from the combustion of fuel and primary combustion air are exhausted as flue gases from combustion chamber 25 through exhaust port 24 from which they enter regenerator 18. As the hot flue gases pass through regenerator 18 and are exhausted to a stack, heat is transferred from the hot flue gases to regenerator 18. When the temperature in regenerator 18 reaches a certain level, the flows within regenerative furnace 10 are reversed, with primary combustion air being introduced into the base of regenerator 18. As the primary combustion air passes through regenerator 18, heat is transferred from the regenerator to the combustion air which subsequently passes through port 24 and into combustion chamber 25. During this firing cycle, the flame is generated by a burner (not shown) proximate port 24 and the resulting combustion products are exhausted through port 12 and regenerator 11.

To reduce $NO_x$ emissions from industrial furnaces, in particular, regenerative furnaces, without adverse effects on or with improvements in product quality, production rate, furnace thermal efficiency, and other air pollutant emission levels, it is necessary to limit the amount of oxygen initially available for combustion and still provide sufficient flame temperatures for effective heat transfer from flame 19 to load 20. In accordance with one embodiment of this invention, these conditions are achieved using oxygen-enriched combustion in which the amount of primary oxidant, preferably combustion air, introduced into combustion chamber 25 through primary combustion air port 12 is maintained at about 0.85 to about 1.15 of the stoichiometric ratio for complete combustion of the fuel forming a primary combustion zone within combustion chamber 25, and secondary oxidant in the form of oxygen, oxygen-enriched ambient air or oxygen-enriched hot air is injected into combustion chamber 25 downstream of flame 19, forming a secondary combustion zone. In this way, the majority of the combustion, that is, combustion in the primary combustion zone, is relatively low in oxygen concentration to inhibit $NO_x$ formation and any resulting combustibles are burned out at lower temperatures near exhaust port 24. Burning natural gas under near stoichiometric conditions produces a highly luminous flame which promotes effective heat transfer from flame 19 to load 20.

In accordance with one embodiment of this invention, preheated secondary combustion air for injection into combustion chamber 25 downstream of flame 19 is aspirated through line 14 from top portion 13 of regenerator 11 using aspirator/ejector 15. This preheated secondary combustion air is enriched with oxygen to increase furnace-combustion specific production rate and combustibles oxidation and injected through line 16 into combustion chamber 25 downstream of flame 19. The use of oxygen-enriched secondary combustion air increases secondary combustion zone temperatures to increase heat transfer to the load in the furnace and improves combustible burnout of combustibles in the exhaust gases. However, the increase in secondary combustion temperatures does not significantly increase the amount of $NO_x$ emitted from the furnace, as would be expected in known oxygen-enriched combustion processes. By comparison, injecting ambient air downstream of flame 19, a technique known to those skilled in the art, reduces $NO_x$ emissions from the furnace, but it also reduces furnace productivity and furnace thermal efficiency.

In accordance with a preferred embodiment of this invention, preheated secondary combustion air is aspirated from regenerator top 13 using industrial grade oxygen having oxygen concentrations from about 35% to about 100% which is preferably available at high supply pressures through line 17.

In accordance with yet another embodiment of this invention, the furnace is operated with near-stoichiometric primary combustion air, providing between about 85% and about 115% preferably between about 90% and about 105%, of the total amount of oxygen required for complete combustion, and a small amount of high-velocity ambient or preheated oxygen-enriched secondary combustion air, providing preferably between about 5% and about 40% of the total amount of oxygen required for complete combustion of the fuel, is injected near exhaust port 24 to burn out any residual carbon monoxide and total hydrocarbons.

An industrial furnace for oxygen-enriched combustion in accordance with this invention comprises combustion chamber 25, means for preheating an oxidant, preferably air, in the form of regenerator 11 in communication with combustion chamber 25, burner 21 for introducing a fuel into combustion chamber 25 and primary combustion air port 12 for introducing at least a portion of the preheated oxidant into combustion chamber 25. The furnace, in accordance with this invention, further comprises means for withdrawing a portion of preheated oxidant from regenerator 11 in the form o aspirator/ejector 15 in communication with regenerator top 13 of regenerator 11. The withdrawn preheated oxidant is introduced through line 16 in communication with aspirator/ejector 15 through exhaust port 24 into combustion chamber 25 downstream of flame 19. Regenerator 18 is provided for exhausting combustion products from combustion chamber 25.

To retrofit the process of this invention to an existing regenerative industrial furnace merely requires the addition of line 14 in communication with regenerator top 13, aspirator/ejector 15 in communication with line 14 and positioned to aspirate preheated oxidant from regenerator 11, line 17 which supplies an aspirating fluid, preferably industrial grade oxygen, to aspirator/ejector 15 and line 16 in communication with aspirator/ejector 15 and combustion chamber 25 through which preheated, secondary oxidant, preferably preheated oxygen-enriched, secondary combustion air is introduced into combustion chamber 25.

While in the foregoing specification, this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A process for oxygen-enriched combustion of a fuel in an industrial furnace comprising:
    preheating a primary oxidant required for combustion of a fuel in a heat exchanger;
    introducing said fuel and at least a portion of said preheated primary oxidant into said industrial furnace, producing a fuel/oxidant mixture and forming a primary combustion zone, said primary oxidant comprising between about 85% and about 115% of the total amount of oxygen required for complete combustion of said fuel;
    igniting said fuel/oxidant mixture producing a flame;
    removing heat from said primary combustion zone;
    introducing a secondary oxidant into said industrial furnace forming a secondary combustion zone downstream of said primary combustion zone producing products of combustion, said secondary oxidant having an oxygen concentration greater than the oxygen concentration in air; and
    exhausting said products of combustion.

2. A process for oxygen-enriched combustion of fuel in accordance with claim 1, wherein said secondary oxidant is one of oxygen and a mixture of oxygen and air.

3. A process for oxygen-enriched combustion of fuel in accordance with claim 2, wherein said preheated air is aspirated from said heat exchanger using oxygen.

4. A process for oxygen-enriched combustion of fuel in accordance with claim 1, wherein said secondary oxidant comprises between about 5% to about 40% of the total amount of oxygen required for complete combustion of said fuel.

5. A process for oxygen-enriched combustion of fuel in accordance with claim 1, wherein said fuel is natural gas.

6. A process for oxygen-enriched combustion of fuel in accordance with claim 1, wherein said industrial furnace is a regenerative furnace.

7. A process for oxygen-enriched combustion of fuel in accordance with claim 6, wherein sad heat exchanger is a regenerator.

8. A process for oxygen-enriched combustion of fuel in accordance with claim 1, wherein said preheated primary oxidant comprises between about 90% and about 105% of the total amount of oxygen required for complete combustion of said fuel.

* * * * *